Aug. 7, 1962     C. E. FISHER     3,048,464

WATER SOLUBLE DYE FORM AND METHOD OF MAKING

Filed April 7, 1959

INVENTOR.
CARL E. FISHER
BY
*Barnes, Kisselle, Raisch & Choate*
ATTORNEYS 3,048,464
WATER SOLUBLE DYE FORM AND METHOD OF MAKING
Carl E. Fisher, 945 Coolidge, Clawson, Mich.
Filed Apr. 7, 1959, Ser. No. 804,838
6 Claims. (Cl. 8—79)

This invention relates to water soluble dyes and particularly to a form of water soluble dyes which is stable under varying conditions of temperature and humidity.

In the use of water soluble dyes certain problems are presented due to the presence of moisture in the atmosphere which complicates the matter of handling and use of water soluble dyes. For example, in one important application of water soluble dyes, the dyes are used in markers which are intended to provide a visual color indication on the surface of water to indicate an emergency or to locate a ship or other device. In such a use, it is necessary that the marker gradually and progressively release the dye over a prolonged period of time. In addition, an immediate release of some of the dye is required so that no protective wrapping can be used which must be torn away or otherwise broken in order to permit the water to contact the dye. Furthermore, since the markers must be stored under varying conditions of temperature and humidity, such as are found in ship holds or in tropical areas, the dye markers must be able to withstand varying degrees of temperature and humidity.

Since such markers are intended primarily for use in salt water, a further problem arises due to the tendency of some water soluble dyes to have a film formed thereon due to their slow rate of solubility in salt water.

It is therefore an object of this invention to provide a dye form which can be used in dye markers to immediately and progressively release dye when the marker is placed in salt water; which dye form is stable under varying conditions of temperature and humidity.

The use of water soluble dyes in other applications also present substantial problems due to the usual form of the dyes, namely, powder which produces conditions of dust and makes it very difficult to handle the dyes.

It is therefore an object of this invention to provide a dye form which is substantially non-hygroscopic, free from dust, may be easily handled and which will retain the color.

It is a further object of the invention to provide a novel method of making dye markers and the novel dye form.

Basically, the dye form comprises blocks or pellets which are made by melting mannitol, uniformly distributing the water soluble dye in the mannitol and finally permitting the mannitol to solidify.

Figure 1:
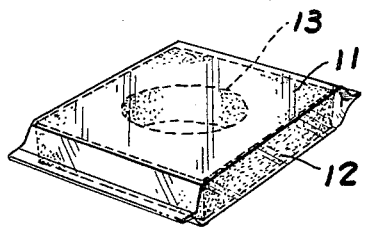
FIG. 1 is a perspective view of a dye marker embodying the invention.
Figure 2:
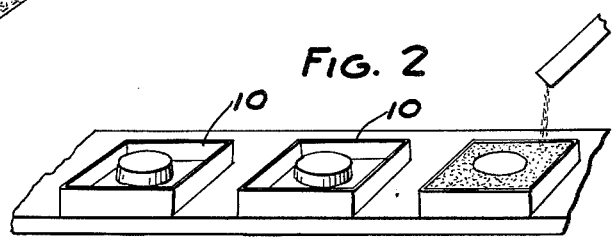
FIG. 2 is a perspective view of an apparatus for performing the method of making the dye markers.

According to the invention, mannitol is heated until it is molten and a water soluble dye is uniformly distributed in the molten mannitol. The mannitol is then poured into molds 10 and permitted to solidify after which a block 11 which has been formed is removed. The resultant block 11 will upon being placed in water immediately and progressively release the dye. The block may be stored under varying conditions of temperature and humidity without any adverse effects. In order to facilitate the handling of the dye markers 11 and prevent some of the dye from being transferred to the hands of workers handling the markers due to the moisture on the hands, a protective coating of water soluble material such as a film of polyvinyl alcohol or methyl cellulose is applied to form a bag 12 surrounding the marker 11. This bag prevents any adverse action on the marker under normal handling but does not prevent moisture from penetrating the bag so that when the marker is placed in water the bag immediately dissolves and the marker begins to release the dye.

Figure 3:
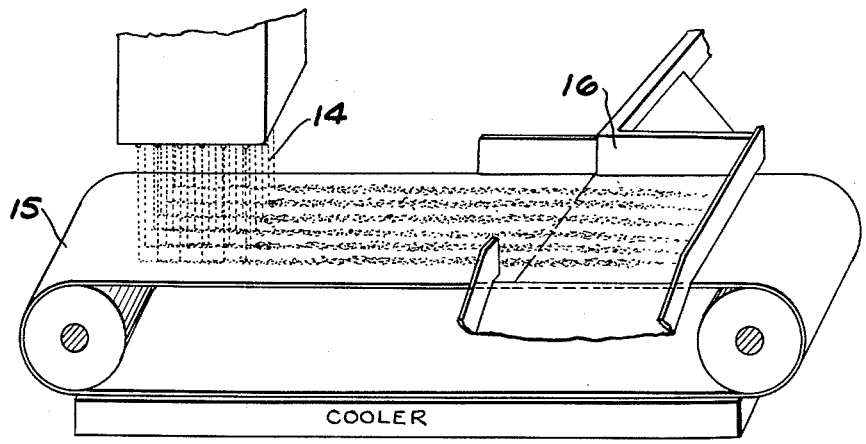
FIG. 3 is a perspective view of an apparatus for making the pellet form of the dye.

As shown in FIG. 3, I have found that a dye marker 11 without any wrapper made in accordance with the invention will withstand temperature ranges 30 to 100° C. and up to 90% relative humidity for a prolonged period of time without any adverse effects.

The amount of dye provided in the mannitol may vary depending upon the concentration of the dye required. In addition, the amount of dye released by any marker may be varied by providing a hole 13 (FIG. 1) in the marker so that there is more or less material in the marker as required. Numerous well-known water soluble dyes may be used including Rhodamine B, Rhodamine 6G, fluorescein, methyl violet, tartrazine, and others which are well-known.

The following examples of compositions give satisfactory result:

*Example I*

|  | Parts |
|---|---|
| Rhodamine B | 20 |
| Rhodamine G | 10 |
| Mannitol | 50 |

*Example II*

| Sodium fluorescein | 10 |
|---|---|
| Mannitol | 90 |

*Example III*

| Gentian violet | 30 |
|---|---|
| Mannitol | 70 |

*Example IV*

| Rhodamine B | 40 |
|---|---|
| Mannitol | 60 |

*Example V*

| Tartrazine (yellow) | 20 |
|---|---|
| Mannitol | 80 |

Depending on the nature of the water soluble dye, it may or may not go into solution in the molten mannitol.

Referring to FIG. 3, instead of forming a cake from the molten mannitol containing the water soluble dye material, the mannitol may be extruded in a plurality of fine streams 14 onto a cooled belt 15. As the streams strike the belt, pellets 16 are formed and as the belt moves along a scraper 16 scrapes the pellets 16 off the belt. This produces a form of dye which can be easily stored without any protection and which will withstand a wide range of temperatures and humidities.

Figure 4:
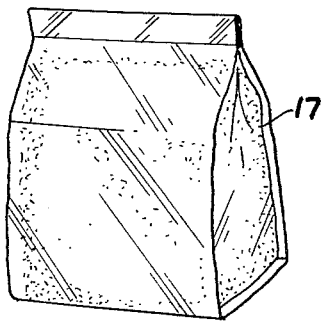
FIG. 4 is a perspective view of another form of the dye.

The resultant pellets 16 can be packaged as shown in FIG. 4 in bags 17 of water soluble material such as polyvinyl alcohol or methyl cellulose and sold in that form so the consumer need only throw the bag into water to provide the necessary dye. Since the cost of mannitol is small compared with cost of the dye, the added cost of this dye form is not very great considering the beneficial results which are obtained.

Other applications of the dye forms can be readily appreciated. For example, the cakes may be made small enough to be used in water painting. When use in water painting, the nature of the mannitol insures that the water on the painter's brush will only penetrate the immediate surface and only sufficient dye will be removed from the block by the brush as is required, the remainder of the block or cake 11 remains intact thus preventing the usual messiness and waste that occurs with the normal types of blocks that are used in water painting.

It can thus be seen that I have provided a form of dye which will immediately and progressively release dye when the form is placed in or comes in contact with fresh or salt water; which will withstand varying temperatures and humidities; which may be easily handled and which is free from dust. In addition, I have provided a novel method of making such dye forms either in blocks or pellets.

I claim:

1. A dye marker for gradually releasing a dye into salt water, said marker being stable under conditions of relatviely high humidity and relatively great ranges in atmospheric temperature, said marker comprising a block of solid mannitol having a water soluble dye dissolved uniformly therein, said mannitol comprising the major constituent of said block.

2. The marker set forth in claim 1 wherein said dye marker is made from a solution of molten mannitol and water soluble dye.

3. The combination set forth in claim 1 including a wrapping of water soluble film surrounding said block.

4. The method of forming a dye form which is stable under varying conditions of relatively high humidity and varying temperature which comprises melting mannitol, uniformly distributing in the molten mannitol a water soluble dye which is soluble in the mannitol, pouring the molten mannitol containing the water soluble dye in solution into a mold, and permitting the molten mannitol containing the water soluble dye to solidify.

5. The method of making a dye form which is stable under varying conditions of varying temperatures and relatively high humidity which comprises melting mannitol, adding a water soluble dye to the molten mannitol, forcing the molten mannitol containing the dye in solution through orifices onto a surface having a temperature less than the temperature of the molten mannitol to solidify the mannitol containing the water soluble dye into pellets.

6. A dye form comprising solid pellets of mannitol having water soluble dye dissolved uniformly therein, said mannitol comprising the major constituent of said pellets.

References Cited in the file of this patent

UNITED STATES PATENTS

| | | |
|---|---|---|
| 854,332 | Cornelison | May 21, 1907 |
| 1,710,076 | Schlatter | Apr. 23, 1929 |
| 1,804,245 | Bruce | May 5, 1931 |
| 2,458,540 | Tuve et al. | Jan. 11, 1949 |
| 2,519,825 | De Ment | Aug. 22, 1950 |
| 2,675,776 | Tuve | Apr. 20, 1954 |
| 2,769,749 | Eckardt et al. | Nov. 6, 1956 |
| 2,878,160 | Smedresman | Mar. 17, 1959 |
| 2,884,410 | Randall | Apr. 28, 1959 |

OTHER REFERENCES

Textile Chemicals and Auxiliaries, 2nd ed., Speel and Schwartz, Reinhold Pub. Corp., N.Y., 1957, pages 285–287.